Figure 1:
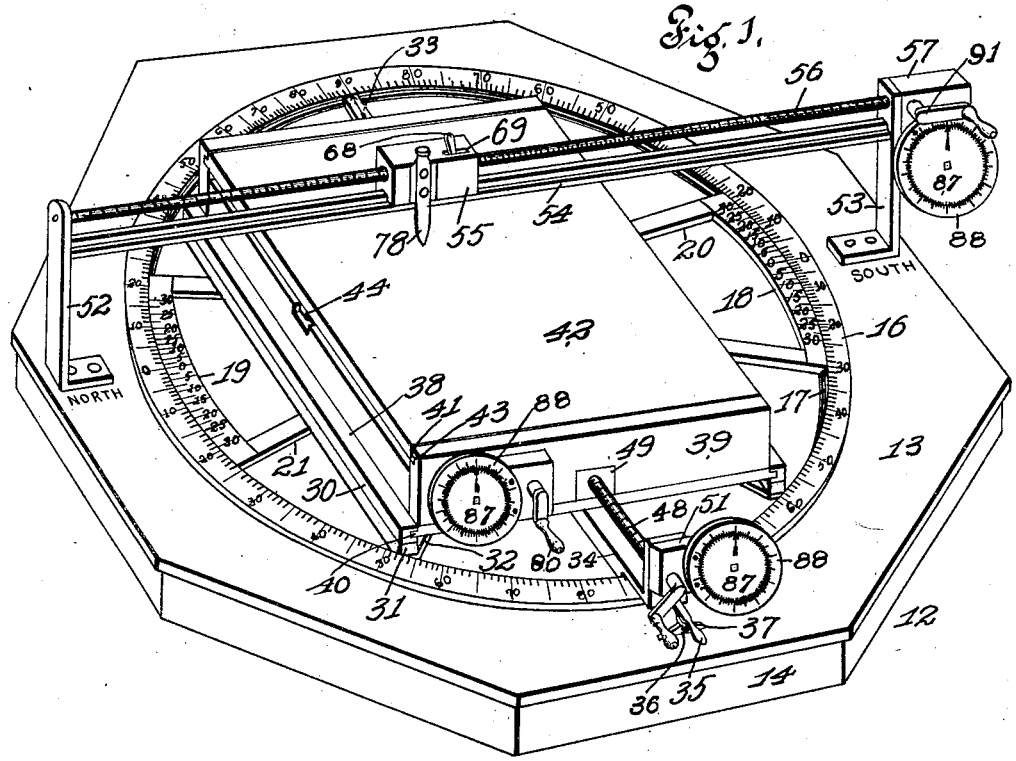

J. H. BLAIR.
DRAFTING INSTRUMENT.
APPLICATION FILED DEC. 18, 1912.

1,113,404.

Patented Oct. 13, 1914.
3 SHEETS—SHEET 1.

Witnesses
W. J. Davis
M. G. Lindsay

Inventor
Joseph H. Blair

J. H. BLAIR.
DRAFTING INSTRUMENT.
APPLICATION FILED DEC. 18, 1912.
1,113,404.
Patented Oct. 13, 1914.
3 SHEETS—SHEET 2.
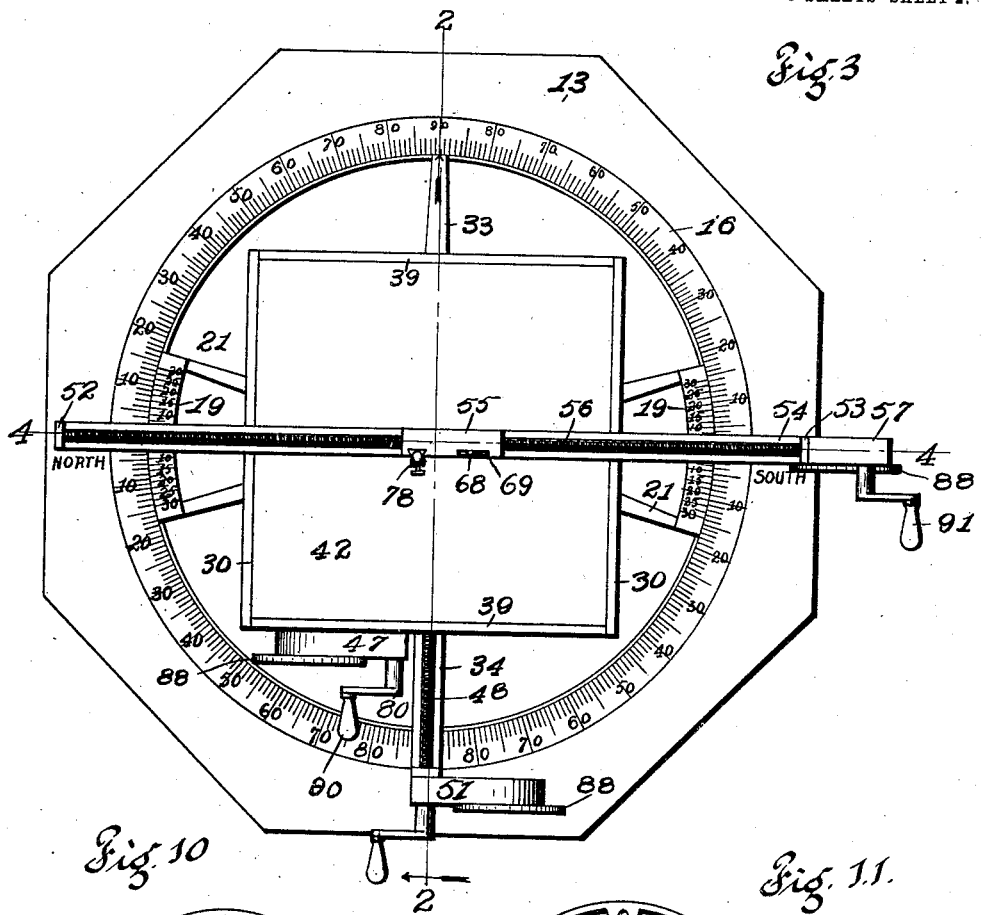
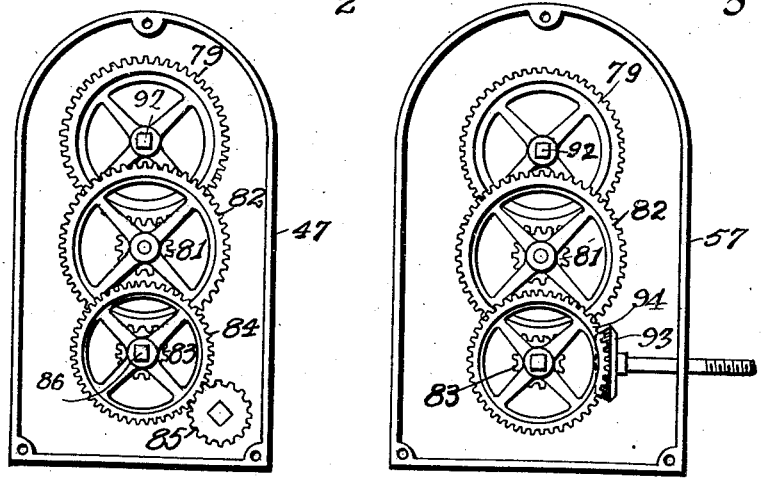
Witnesses
W. J. Davis
M. G. Lindsay
Inventor
Joseph H. Blair.

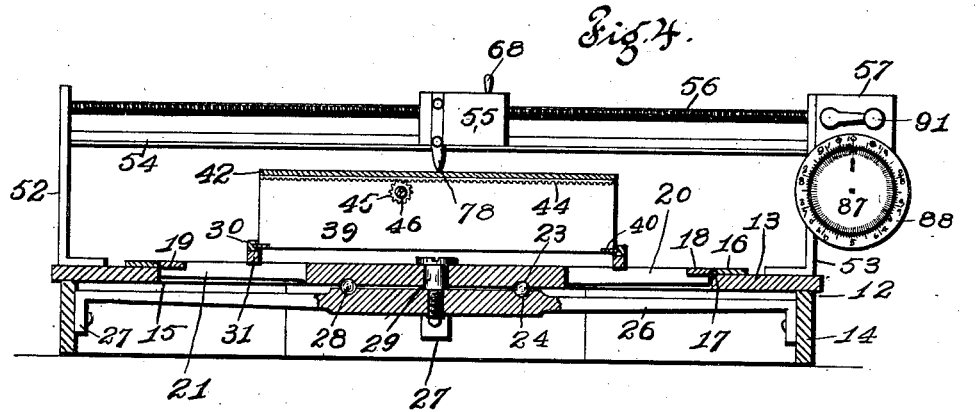
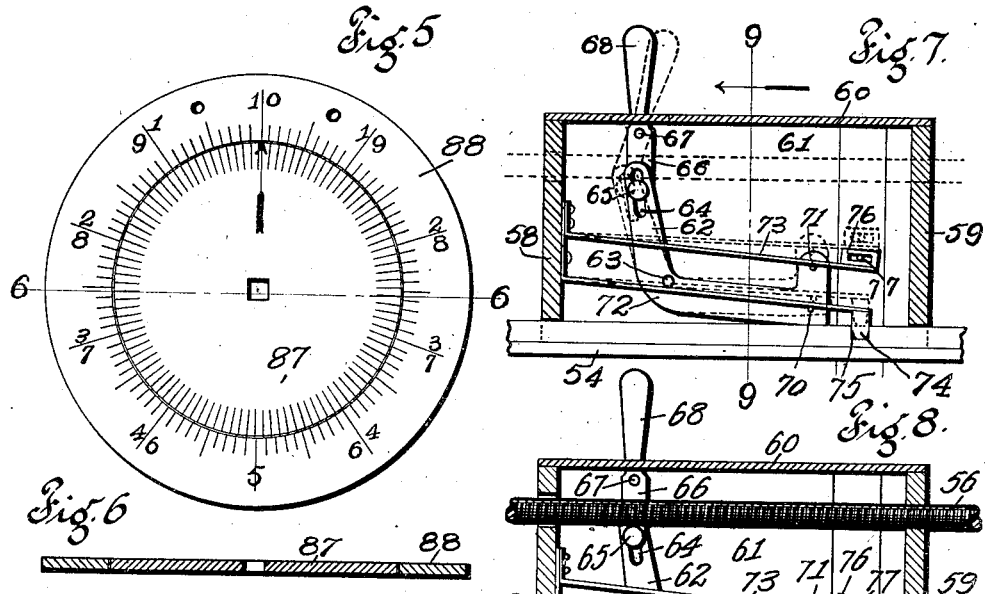
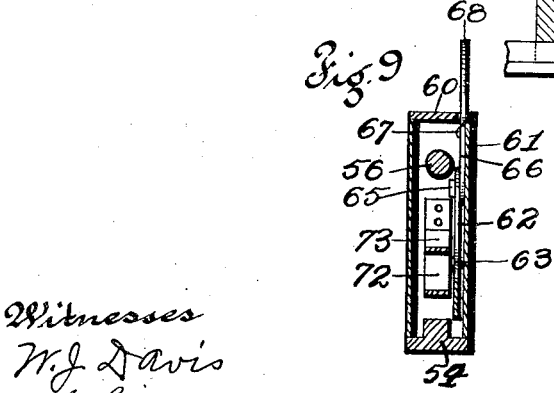

UNITED STATES PATENT OFFICE.

JOSEPH H. BLAIR, OF BOWLING GREEN, MISSOURI.

DRAFTING INSTRUMENT.

1,113,404. Specification of Letters Patent. Patented Oct. 13, 1914.

Application filed December 18, 1912. Serial No. 737,506.

*To all whom it may concern:*

Be it known that I, JOSEPH H. BLAIR, a citizen of the United States, residing at Bowling Green, in the county of Pike and State of Missouri, have invented new and useful Improvements in Drafting Instruments, said invention being improvements of an old drafting instrument, a former invention for which Letters Patent were issued to me December 24, 1907, and numbered 874,384.

This invention relates to improvements in drafting instruments and has for its object a base on which is pivotally and slidably mounted a drawing board and a graduated compass circle fixed to the base with which registers two double verniers, which operate simultaneously with the pivotal movement of the drawing board, and a marker located above the drawing board and means for carrying the marker in a vertical position maintaining its point continuously in contact with the paper while a line is being drawn, and a means for automatically measuring and registering the length of the line drawn.

A further object of my invention is to construct a drafting instrument which is provided with a stationary, graduated compass circle, a centrally located drawing board pivotally mounted, means for sliding the board, and a marker supporting device operating across the drawing board, and means for automatically measuring and registering the length of a line and the meridian distance, and latitude of any point of such a line drawn on paper or other drafting medium secured to the board.

A further object of my invention is to construct a drafting instrument having a graduated compass circle, two double verniers registering with the compass circle, and centrally pivoted, and an adjustable drawing board located centrally in the compass circle and operating simultaneously with the movement of the verniers, and means for adjusting the movement of the board by which a line may be drawn on paper or other medium at any required angle and length, and a marker operating above the board for drawing lines of any predetermined length and angle to each other.

Figure 2:
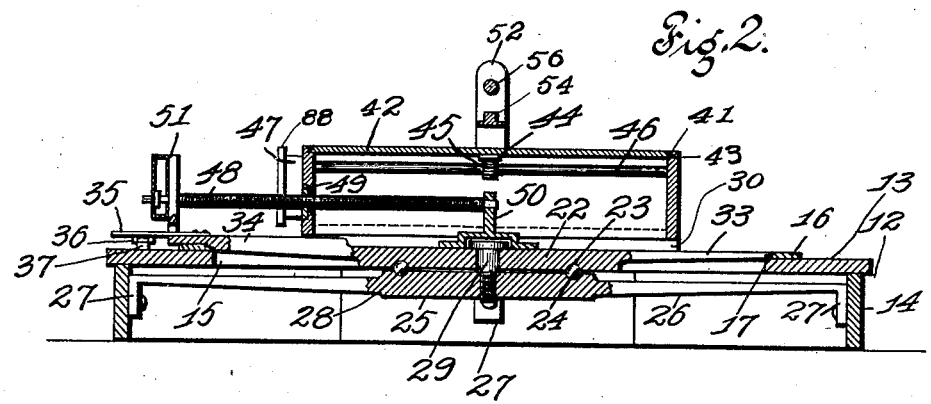

Figure 1 is a perspective view of my complete invention. Fig. 2 is a central sectional view taken on the line 2—2 of Fig. 3. Fig. 3 is a top plan view. Fig. 4 is a central sectional view taken on the line 4—4 of Fig. 3. Fig. 5 is a plan view of one of the measuring disks made use of in carrying out my invention. Fig. 6 is a cross-sectional view of the same taken on the line 6—6 of Fig. 5. Fig. 7 is a detail cross-sectional view of the marker supporting mechanism. Fig. 8 is a similar sectional view to Fig. 7 showing the operating screw in position for operating the marker over the drawing board. Fig. 9 is a cross-sectional view of the same taken on the line 9—9 of Fig. 7. Fig. 10 is a detail view of the mechanism used in connection with my invention. Fig. 11 is a detail view of the mechanism by which the marker screw is manipulated.

Similar figures refer to similar parts throughout the several views.

In the construction of my invention, I provide a suitable base 12 which is constructed with a table portion 13 mounted on sides or supporting bases 14; the center of the table portion is cut away forming a circular opening 15. On the top of the table portion and registering with the circular recess is mounted a compass circle 16 firmly secured to the table, and on the face of the circle are graduations divided into degrees ranging from zero to ninety, the zeros being located on a line with the north and south points; the graduated circle is firmly fixed and its inner surface is flanged as indicated by the numeral 17, and on this flange rest and ride a pair of double verniers 18 and 19, their faces also being graduated as shown in the illustration; these verniers are connected to arms 20 and 21 extending inwardly and terminating into a center plate 22; the bottom surface of this plate is provided with a curvilinear groove 23, which corresponds with a like groove 24 formed in a supporting plate 25 from which radiate arms 26, the ends 27 thereof being firmly secured to the inner side of the side members 14. In the curvilinear grooves 23 and 24 are located bearing balls 28 and the two plates are secured together by means of a threaded stud 29, which holds the plate 22 firmly in position and yet permits the same to act as a turn-table permitting the same, together with the parts which it supports, to rotate on an axis and be shifted to any desired degree or angle.

From the plate 22 radiates a plurality of arms, four of which act as a support for a drawing board frame 30, these arms extending from the center to the corners 31 of the frame and said arms being indicated in Fig. 1 by the numeral 32. From the plate 22 also radiates two arms 33 and 34, the free ends being flanged to correspond with flange 17 of the compass ring, the arm 34 projecting slightly above the ring and is provided with a spring member 35 provided with a large lug 36 and arranged to communicate with a recessed latch member 37 located on the table 13 and which supports the rotating member of the invention in its normal position.

The drawing board frame 30 has two parallel grooved members 38 in which is supported and slidably mounted a box 39 consisting of side and end walls and is provided with tongues 40 which are seated in the grooves of the members 38. Two of the walls comprising the box 39 are provided with grooves 41 which extend their entire length and in which is seated a drawing board 42, two edges thereof being provided with tongues 43 which act as a guide for the drawing board, so that the same may be shifted in the frame; at the bottom of the drawing board 42 and approximately centrally located is a fine toothed rack bar 44, with which is designed to mesh a fine toothed pinion 45 mounted on a shaft 46, this shaft has bearing in the sides of the box, the one end projecting into a casing 47 in which is located a train of gears as illustrated in Figs. 10 and 11, the arrangement and operation of which will be hereinafter fully described.

Through one end of the box 39 and running parallel with the arm 34 is a screw 48, the threads thereof operating in the threaded nut 49 firmly located in the box; the inner end of the screw is supported in a bearing 50 approximately centrally located and may be arranged to straddle the stud 29 as shown, the outer end of the screw being supported in the casing 51 which is also provided with a train of gears as illustrated in Figs. 10 and 11. By means of this screw the box is slid in the guides when the screw is operated. On the table 13 is located a pair of brackets 52 and 53, and connected to said brackets is a guide bar 54 on which is supported and slidably mounted a marker supporting casing 55, and from bracket to bracket and arranged parallel with the guide bar is a threaded screw 56 which has bearing in the brackets, its one end projecting into a casing 57, which is provided with a train of gears as that shown in Fig. 11, the description and operation of which will be fully hereinafter described.

The marker supporting casing 55 which is mounted on the guide bar 54 consists of two end walls 58 and 59, a top 60 and two side walls 61, the end walls 58 and 59 are provided with an aperture through which the threaded screw 56 passes, the aperture in the wall 59 is suitably screw-threaded so that by the turning of the screw 56 the casing is shifted on the guide bar 54. In this casing is located a lever mechanism consisting of a bell-crank 62 pivoted at the point indicated by the numeral 63, the upper end having a slot 64 through which a pin or screw 65 is passed and by which the bell-crank is connected to the end of a lever 66 pivoted at the point indicated by the numeral 67 and the handle 68 projecting through the top through an elongated slot 69; the bottom end of the bell-crank is provided with two pins or projections 70 and 71 and which pins are designed to contact with spring members 72 and 73 the one end thereof being secured to the end wall 58 of the casing, the opposite end of the spring member 72 having a lug or projection 74 which is arranged to seat itself in a depression 75 formed in the guide bar and so located as to stop the casing with the marker point directly over the center of the compass circle. The pin 71 engages with the spring member 73 so as to raise the same, the free end of the spring member having a slotted projection 76 in which projects a pin 77 formed on the marker 78, which is slidably mounted and held in the side of the casing, and by this manner the marker can be elevated above the paper on the drawing board when shifting the same to a desired spot before making the necessary line.

I will now describe the structure by which the various parts are operated: In each of the casings are located a train of gears; the shaft 46, and the screws 48 and 56 project into the casings, and shaft 46 and the screw 48 are each provided with a gear wheel 85, which meshes with gear 84, the shaft of which gear 84 projects through the entire casing and is provided with a squared end 86 on which is placed a crank handle 80 for operating the screw and gear 84 simultaneously, on the shaft of gear 84 is located a pinion 83 which meshes with gear 82, on the shaft of this gear 82 is also located a pinion 81 which meshes with gear 79, having a projecting shaft 92 extending through the casing and on the squared end of which is firmly fixed a disk 87, which coöperates with a ring 88, which is firmly fixed to the casing. On the ring is inscribed a circular scale of linear measure, divided into one hundred equal divisions, numbered each way in groups of ten divisions, from 1 to 10, both inclusive. Each division may represent an inch, foot, yard, rod, chain, or mile, as may be required. On the disk 87 is inscribed a circular vernier, consisting of 99 equal divisions, which reads each division of the ring to its one-hundredth (1/100) part. By this arrangement whenever the crank connected with the screw 48 is operated the screw rotates moving and adjusting the frame connected with it to the exact extent indicated by the dial; and whenever the crank connected with the shaft 46 is operated the shaft rotates moving and adjusting the drawing board in said frame to the exact extent indicated by the dial.

The screw 56 projects into the casing 57 through its edge and is provided with a bevel gear wheel 93, which meshes at right angles with bevel gear wheel 94, the shaft of which gear wheel 94 projects through the entire casing and is provided with a squared end on which is placed a crank handle 91 for operating the screw and gear 94 simultaneously, on the shaft of which is located pinion 83 which meshes with gear 82, on the shaft of this gear 82 is also located a pinion 81, which meshes with gear 79, which has a projecting shaft 92 extending through the entire casing and on the squared end of same is firmly fixed the disk 87 operating in the ring 88, which said disk and ring are fully described above, by which arrangement whenever the crank 91 is operated the screw rotates moving the marker supporting casing and marker therein, and the line drawn by the marker is correctly drawn to the exact extent indicated by the dial.

The screw 48 is operated when desiring to shift the drawing board frame in its guides 30; the shaft 46, used to shift the drawing board in the drawing board frame, and the screw 56 is used to operate the marker supporting casing for drawing a line from any point outwardly toward the center of the compass circle or from said center outwardly, and by the rotating mechanism on which the drawing board frame is mounted, can be turned to any convenient degree or angle as indicated on the compass circle and verniers 18 and 19 so as to draw any angle on the drawing paper.

Having fully described the construction of my invention I will now describe the operation: The drawing paper is firmly fixed to the drawing board 42 and the entire rotating member is then moved to the proper point so that the vernier will register with the proper indications on the compass disk. To draw a line north 20 degrees east 8.66 chains proceed as follows: Rotate the drawing board device so that the index 0 of the vernier at the north point of the compass circle coincides with the twentieth division of the northwest quadrant of the circle; the lever or handle 68 of the marker supporting device is then operated so that the spring support or lug 74 is released from the depression 75; by this operation the marker is also slightly elevated so as to remove the point from the paper. The crank 91 is operated so as to advance the marker supporting device toward the north end of the guide rod until the index of the vernier on the casing 57 arrives at the eighth division of the scale ring in which it is mounted, and further until some division of the vernier first coincides with the sixty-sixth division of the scale ring. The lever or handle 68 is then reversed lowering the marker point against the paper. The crank 91 is then turned moving the marker supporting device drawing the marker point on the paper until it is halted by the spring support or lug entering the depression 75 which is located on the guide bar then the line will be drawn. The drawing board is then sufficiently rotated until the zero (0) point of the vernier coincides with the north zero (0) point of the compass circle and the line will appear at its proper angle. To ascertain the meridian distance and latitude of the line drawn, and for the further purpose of adjusting the board for drawing a connecting line of any given figure the drawing board frame is operated by manipulating the crank controlling the screw 48, and the drawing board proper is shifted by manipulating the crank controlling the movement of the shaft 46; continue this adjustment until the terminal end of the line drawn will appear exactly under the point of the marker which is above the exact center of the compass circle, then the scale connected with the screw 48 will show, assuming that each division of the scale represents a chain, that the meridian distance is 2.96 chains; and the scale connected with shaft 46 will show that the latitude of the line is 8.14 chains.

By this instrument drawings for engineering and architectural purposes are readily, easily and accurately drawn and data procured for computing angles, heights, depth and length without any other aid, the same being automatically ascertained and registered in the process of the drawing.

Having fully described my invention, what I claim is:

1. A drafting instrument comprising a base, a compass circle secured thereon, a member rotatably mounted on said base and having arms provided with verniers registering with said circle, a frame adjustably mounted on said member and rotatable therewith, a drawing board slidably mounted in said frame, means on said member for adjusting said frame, means on said frame for adjusting said board, a support mounted on said base, a marker slidably mounted on said support and means on said support for moving said marker across said board.

2. A drafting instrument comprising a base, a graduated compass circle secured thereon, a rotatable member mounted on said base, verniers carried by said member and registering with the compass circle, an adjustable frame mounted on said member, means on said member for adjusting said frame, means connected to said adjusting means for indicating the distance through which said frame is moved, a drawing board slidably mounted in said frame, means on said frame for operating said board, means connected with the last named means for indicating the distance through which said board is moved, a support mounted on said base, a marker operatively located above said board and slidably mounted on said support, means on said support for moving said marker across said board and measuring means for indicating the distance through which said marker is moved, substantially as specified.

3. A drafting instrument comprising a base, a flanged compass circle secured on said base, a rotatable member mounted on said base inside the compass circle, arms radiating horizontally from said member, verniers formed on the ends of the arms, which are also arranged to register with the compass circle, an adjustable frame mounted on the rotatable member and having an adjustable drawing board mounted therein, means on said member for adjusting said frame, means on said frame for adjusting and operating said board, a support mounted on said base, a guide bar located above said board and mounted on said support, a marker supporting casing slidably mounted on said guide bar, and means on said support for moving said casing across said board.

4. A drafting instrument of the character described comprising a base, a rotatable member mounted thereon, an adjustable frame mounted on said member, having an adjustable drawing board mounted therein, horizontal arms radiating from said member, two double verniers formed on the ends of the arms, a compass circle located on said base, graduated and against which said verniers register, a support mounted on said base, a marker slidably mounted on a guide bar, which bar is mounted on said support, and said support being provided with means for moving said marker, means for indicating the distance through which said marker is moved, means on said rotatable member, and on said frame, for adjusting and operating said frame and board and for indicating the distance through which said frame and board are moved, substantially as specified.

5. A drafting instrument of the class described comprising a base, a graduated compass circle, and a central rotatable portion mounted on said base, a slidable frame having a slidable drawing board therein, mounted on said rotatable portion, means on said rotatable portion for sliding said frame, means on said frame for sliding said board, a support mounted on said base, a marker slidably mounted on a guide bar which bar is mounted on said support, means on said support for moving said marker across said board, means for indicating the distance through which said marker is moved simultaneously with the movement of the marker, means on said rotatable portion for indicating the distance through which said frame is moved simultaneously with the adjusting movements of said frame, means on said frame for indicating the distance through which said board is moved simultaneously with the adjusting movements of said board, horizontal arms projecting from said rotatable portion, verniers carried on the ends of said arms and registering with said compass circle, substantially as specified.

In testimony that I claim the foregoing as my own, I have hereto affixed my signature in the presence of two witnesses.

JOSEPH H. BLAIR.

Witnesses:
 RAS PEARSON,
 JOE TAPLEY.